Aug. 10, 1965 A. VALAKOS ETAL 3,200,336

MODULATION WAVEFORM CONTROL CIRCUIT

Filed Feb. 27, 1961

INVENTORS
AGIS VALAKOS
ARNOLD ROSEN
BY
Nolte & Nolte
ATTORNEYS

United States Patent Office 3,200,336

Patented Aug. 10, 1965

3,200,336

MODULATION WAVEFORM CONTROL CIRCUIT

Agis Valakos, Flushing, and Arnold Rosen, Wantagh, N.Y., assignors to Maxson Electronics Corporation, New York, N.Y., a corporation of New York Filed Feb. 27, 1961, Ser. No. 91,851
5 Claims. (Cl. 325—144)

This invention relates to radio frequency carrier modulation and particularly to a device for accurately controlling the amplitude and waveform of the carrier modulation.

In communications, radar and navigational systems, amplitude modulation of a radio frequency carrier must be closely confined to within very narrow amplitude and frequency limits for proper operation and to prevent interference with other channels. The modulation envelope has generally been controlled by utilizing complex and bulky filters and shaping networks. These methods cause undesirable losses and are unreliable due to changes of environment, non-linearities of thermionic amplifiers and aging of components.

It is, therefore, the principal object of the instant invention to provide a device which accurately controls a carrier modulation envelope to maintain a desired waveform.

The present device utilizes a closed loop feedback system to compare a detected envelope with a reference waveform. An error signal is then amplified to control the gain of an output stage to correct any deviation from the required modulation. One form of the invention is illustrated in the accompanying drawings.

Figure 1:
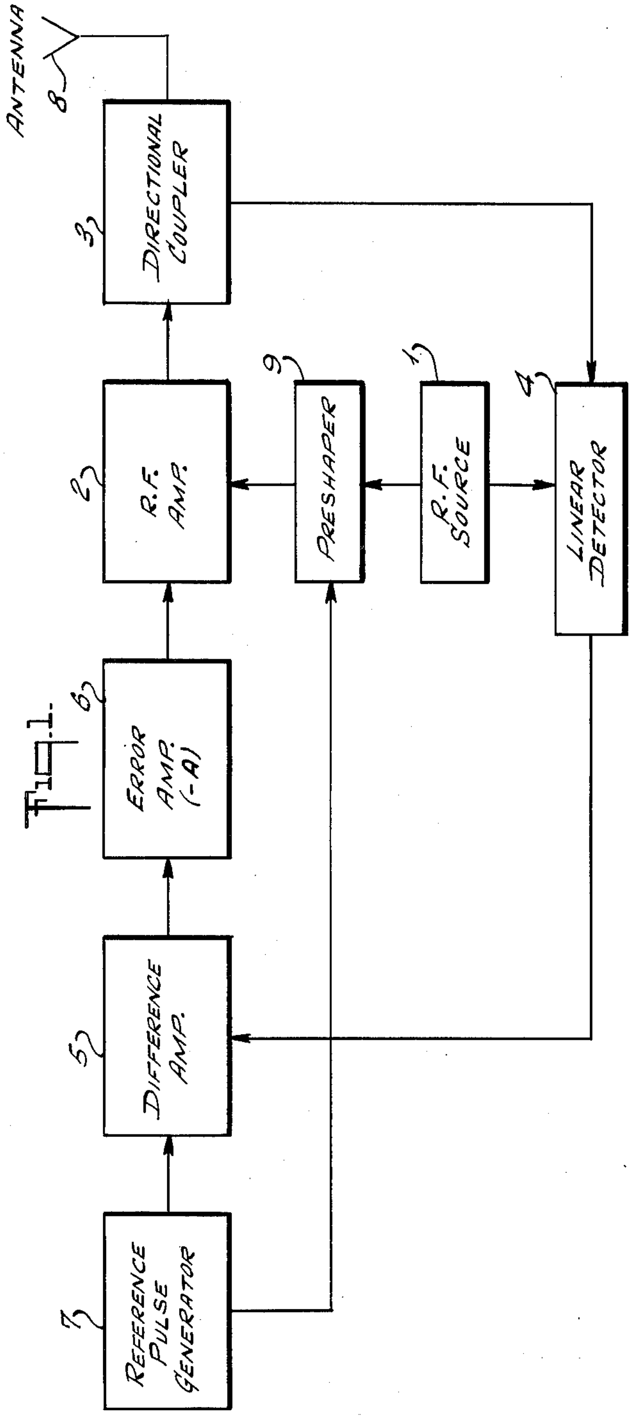
Figure 2:
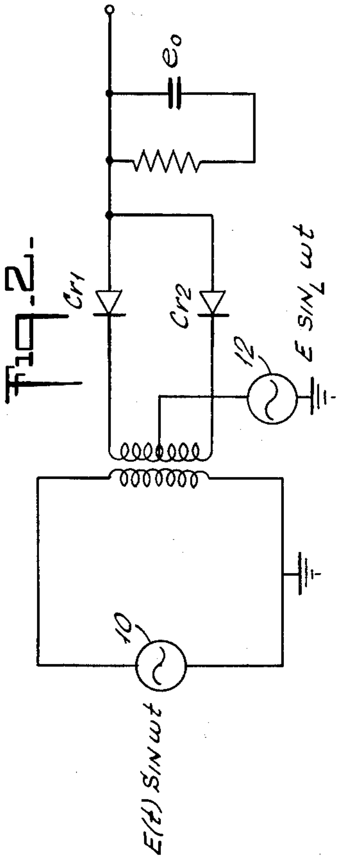

FIG. 1 shows a block diagram of the system for controlling the modulation envelope; and FIG. 2 shows a linear detector circuit utilized as part of the system.

As shown in FIG. 1, a pulse modulated radio frequency signal is generated by RF source 1, amplified in RF amplifier 2, and delivered through directional coupler 3 to the antenna 8. In the absence of the feedback loop, the spectrum of the radiated RF energy is a function of the shape of the pulse out of the RF source 1 and the transfer characteristic of the RF amplifier 2, which in general will not be linear, nor accurately predictable.

A sample of the output of RF amplifier 2 is applied from directional coupler 3 to the linear detector 4, which is shown in FIG. 2. The linear detector 4 is composed of two crystal diodes CR1 and CR2, that are forward biased into the linear portion of their characteristic. The signal frequency 10 from directional coupler 3 is fed to the two diodes in the same phase. A local oscillator signal 12 of the same frequency as signal 10 is fed to the crystal detectors from RF source 1. The voltage out of the detector, $E_0$, is a linear function of the amplitude envelope of the signal voltage if the local oscillator voltage is maintained at a constant value. The linearity and balance of the detector will not be critically dependent on the match of the two diodes if the load resistor is high compared to the forward impedance of the diodes. The load will thus swamp out differences in the forward impedances of the diodes. The large load resistor will reduce the detector efficiency and increase the conversion loss; however, this is tolerable since it is assumed that a high level signal will be sampled and detector loss will be negligible.

The voltage out of the balanced detector 4 is fed to difference amplifier 5. The desired output modulation waveform is generated in reference pulse generator 7 and also applied to amplifier 5. This modulation waveform can have any shape. For example, if the reduction of pulse spectrum side band frequencies is an essential requirement, a desirable realizable pulse of the form $COS^2\ t$ may be employed. The first side lobe peak in the spectrum of a $COS^2\ t$ pulse is suppressed by approximately 20 db more than for the spectrum for a rectangular pulse. The difference between the inputs from blocks 7 and 4 appear as the output of block 5, which is amplified and inverted in error amplifier 6 and applied to a gain control element such as the input grid of RF amplifier 2, with the proper polarity to reduce the error.

The excursions of the error signal applied to the grid can be minimized if the RF pulse output of RF source 1 is modulated in a pre-shaper 9 to approximate the desired shape. The performance of the feedback modulator will depend on the gain and bandwidth of the loop. High loop gain will maintain the error signal small and will be directly related to the improvement provided over open loop operation of the modulator. The bandwidth of the loop must be greater than the bandwidth of the reference waveform to permit response in the loop to any voltage excursion of the reference.

The present invention thus provides accurate control of modulation waveform and amplitude, minimizes cross-talk, and tends to eliminate the need for spectrum filters and non-linear compensation. The device may also be used with broadly tuned amplifiers to evaluate and control RF spectrum. In addition, a wide range of carrier or modulation frequencies may be accommodated. The technique is efficient and lossless since the desired modulation waveform is generated at low audio or video levels.

Although only a single embodiment of the invention has been shown for illustrative purposes, it is apparent that many other variations may be included within the scope of the appended claims.

I claim:

1. A device for controlling the modulation waveform of a radio frequency carrier comprising a source of modulated radio frequency signals, a single amplifier channel series connected to said source of modulated frequency signals for amplifying said modulated signals, antenna means, means for coupling said amplified signal to said antenna, linear detector means, means for feeding a sample of said amplified signal to said detector means, said radio frequency signal source supplying a local oscillator signal of the same frequency, means feeding said local oscillator signal into said detector, difference amplifier means, means applying the output from said detector into said difference amplifier, means generating a reference modulation pulse, means applying said pulse to said difference amplifier, said difference amplifier being adapted to compare said detector output and reference pulse to produce an error signal, means coupled to the output of said difference amplifier for amplifying and phase inverting said error signal, means applying said amplified error signal to control the amplification of said modulated signal amplifying means and the resultant output modulation waveform.

2. A device for controlling the modulation waveform of a radio frequency carrier, comprising a source of modulated radio waves, a single amplifier channel series connected with said source, an antenna, means coupling the output of said amplifier channel to said antenna, envelope detector means connected to said coupling means and said source, means for generating a reference voltage, comparison means coupled to said reference voltage generating means and said detector means for producing a voltage proportional to the difference between said reference voltage and the envelope of said modulated radio waves, and means coupling the output of said comparison means to the input of said amplifier channel whereby the signal from said comparison means is operable to control the gain of said amplifier channel.

3. A device according to claim 2, wherein the signal from said comparison means is only operable to control the magnitude of the output signal from said amplifier.

4. The device according to claim 3, wherein the output voltage of the detector is linearly proportional to the amplitude of the envelope of the input voltage applied thereto.

5. The device according to claim 4, including preshaper means connected in series between said radio wave source and said amplifier means, and means coupling said reference source generating means to said preshaper means.

References Cited by the Examiner

UNITED STATES PATENTS

| | | | |
|---|---|---|---|
| 2,808,569 | 10/57 | Morrison | 332—37 |
| 3,035,234 | 5/62 | Hillman | 332—37 X |

ROY LAKE, *Primary Examiner.*

L. MILLER ANDRUS, ALFRED L. BRODY, *Examiners.*